United States Patent [19]

Tsukuda

[11] Patent Number: 5,438,690
[45] Date of Patent: Aug. 1, 1995

[54] TUNER CIRCUIT SUBSTRATE HAVING A JACK ATTACHMENT PLATE ELECTRICALLY CONNECTED WITH AN EARTH PATTERN

[75] Inventor: Masami Tsukuda, Yokohama, Japan

[73] Assignee: Shintom Co., Ltd., Kanagawa, Japan

[21] Appl. No.: 141,617

[22] Filed: Oct. 27, 1993

[30] Foreign Application Priority Data

Oct. 30, 1992 [JP] Japan .................. 4-316038

[51] Int. Cl.$^6$ ............................... H04B 1/10
[52] U.S. Cl. .................. 455/300; 455/180.4; 455/283; 455/345; 455/347
[58] Field of Search ............ 455/142, 143, 180.4, 455/186.1, 300, 301, 348, 349, 280, 283, 293, 345, 347; 381/86

[56] References Cited

U.S. PATENT DOCUMENTS

| | | | |
|---|---|---|---|
| 4,271,534 | 6/1981 | Takayama | 455/283 |
| 4,291,414 | 9/1981 | Kimura | 455/186.1 |
| 4,555,808 | 11/1985 | Fujimoto | 455/180.4 |
| 4,661,998 | 4/1987 | Yamashita et al. | 455/301 |
| 4,689,825 | 8/1987 | Geigger et al. | 455/301 |
| 4,691,378 | 9/1987 | Kumamoto et al. | 455/301 |
| 5,109,542 | 4/1992 | Ecklund | 455/142 |

Primary Examiner—Edward F. Urban
Assistant Examiner—Andrew Faile
Attorney, Agent, or Firm—Oliff & Berridge

[57] ABSTRACT

In a tuner for converting antenna input signal into audio signals, tuner circuit components are mounted on a tuner circuit substrate. Of the tuner circuit components, FM wave front end circuit components constituting a high-frequency amplifying circuit, a mixing circuit and a local oscillating circuit are surrounded by a shield case. An antenna jack including an earth tube and a signal terminal insulated from the earth tube is mounted on the tuner circuit substrate. The signal terminal of the antenna jack is connected to an antenna input signal pattern of the tuner circuit substrate. The earth tube of the antenna jack is forced in and supported by a jack attachment plate that is an extension of the shield case.

19 Claims, 9 Drawing Sheets

TUNER CIRCUIT SUBSTRATE HAVING A JACK ATTACHMENT PLATE ELECTRICALLY CONNECTED WITH AN EARTH PATTERN

BACKGROUND OF THE INVENTION

1. Field of the Invention

This invention relates to a tuner and a radio receiver using the tuner which enables accurate tracking adjustment and can prevent any radiation of unnecessary frequencies from a local oscillator of a front end circuit.

2. Description of the Related Art

In a radio receiver having an FM receiver function, the unit composed of an FM receiving high frequency amplifying circuit, a mixing circuit and a local oscillator is called a front end. In recent years, the front end circuit is mounted on a single substrate and is shielded by a shield plate, particularly from radio output signals, to prevent interference or oscillation.

Figure 4:
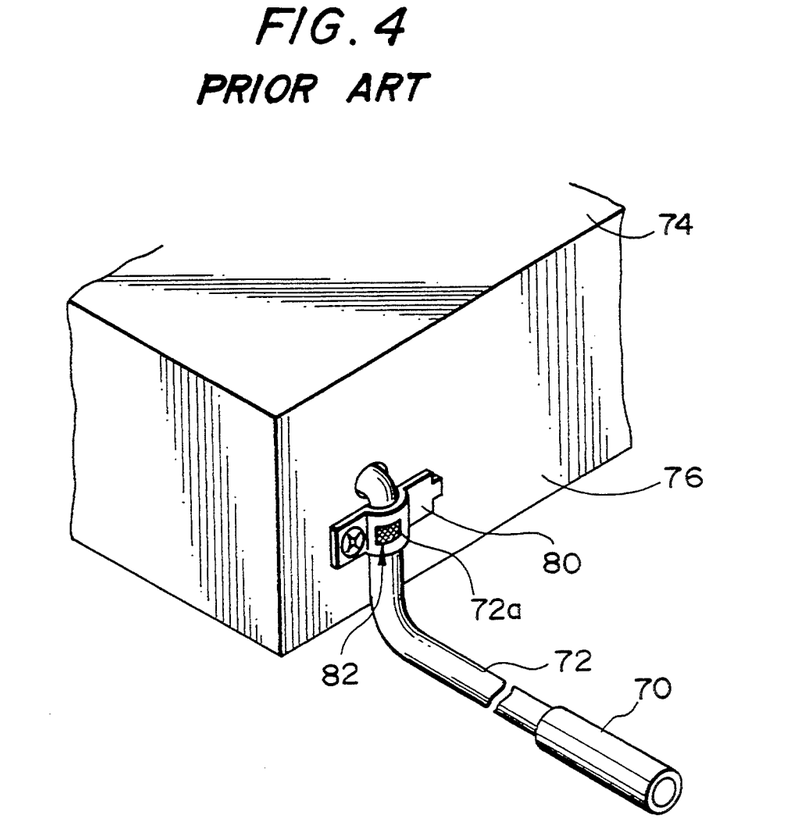
FIG. 4 is a fragmentary perspective view showing a conventional structure in which a front end circuit and an antenna jack are connected to each other using a coaxial cable.
Figure 5:
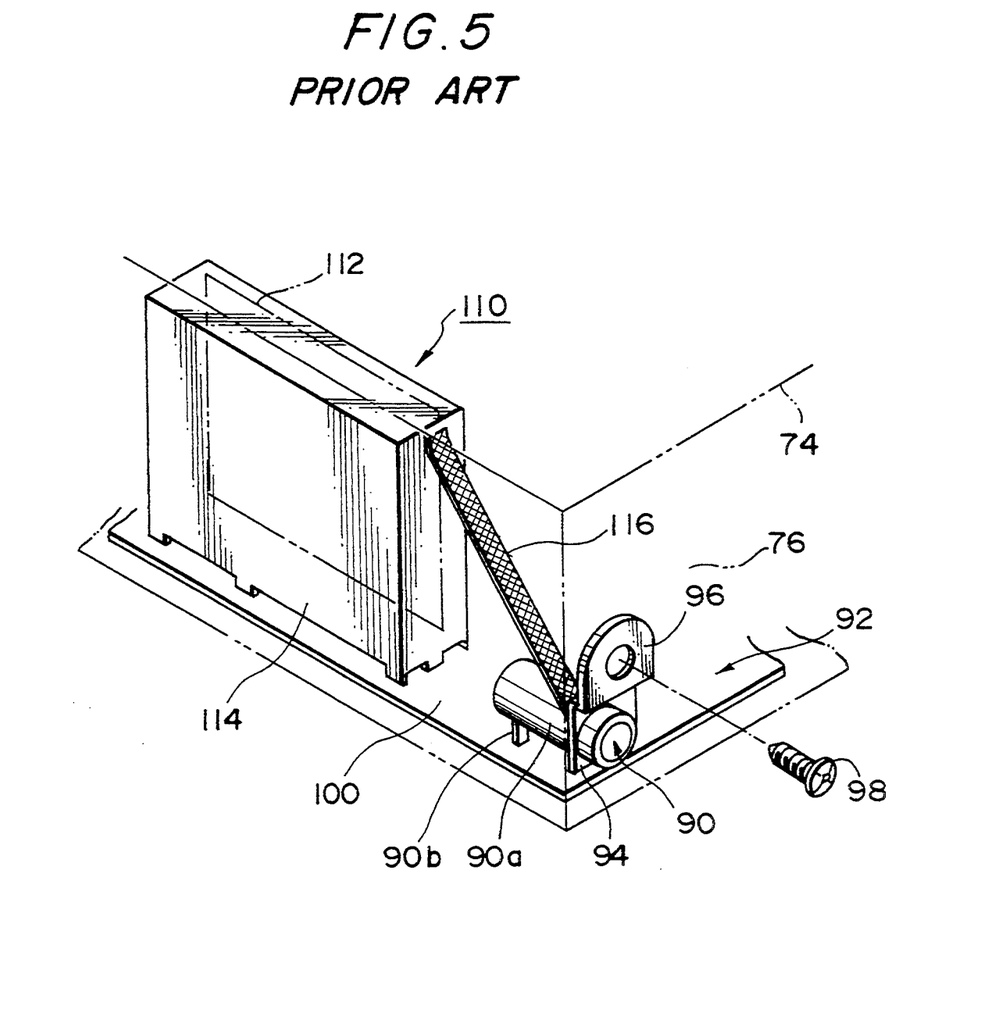
FIG. 5 is a fragmentary perspective view showing a conventional structure in which an antenna jack is attached to a substrate.

In order to introduce antenna input, the front end circuit has structures of FIGS. 4 and 5 of the accompanying drawings as in the case of a radio receiver for a vehicle.

In the structure of FIG. 4, an antenna jack 70, to which a coaxial cable 72 is connected, is attached to a rear surface 76 of a chassis 74. The coaxial cable 72 is fastened by a screw to the rear surface 76 of the chassis 74 using an attachment member 80. At a region corresponding to a cutout 82 in the attachment member 80, an insulating surface layer of the coaxial cable 72 is peeled to expose internal reticular wires 72a. The exposed reticular wires 72a are soldered to the attachment member 80 to connect thereby the antenna jack 70 to the ground. The signal terminal of the coaxial cable 72 is soldered to a pin on the substrate in the chassis 74.

In the structure of FIG. 5, an antenna jack 90 is attached directly to a main circuit substrate 100. The antenna jack 90 is composed of an earth tube 90a and a signal terminal 90b insulated from the earth tube 90a. The signal terminal 90b of the antenna jack 90 is soldered to a signal pattern of the main circuit substrate 100 while the earth tube 90a is supported by an attachment member 92 fixed on the main substrate 100. The attachment member 92 includes force-in plate 94 supporting the earth tube 90a forced into the plate 94. The attachment member 92 also has an attachment strip 96 which is fastened to the rear surface 76 of the chassis 74 by a screw 98. On the main circuit substrate 100, a front end pack 110 is mounted. The front end pack 110 includes at least an FM high frequency amplifying circuit, a mixing circuit and a local oscillating circuit, which are all mounted on a substrate 112 supported in a shield case 114.

The conventional structures of FIGS. 4 and 5, could not effectively prevent the transmitting output from the local oscillating circuit in the front end pack from leaking unnecessary radiation.

According to the structure of FIG. 4, the earth terminal of the coaxial cable 72 is connected to the chassis 76 by the attachment member 80. The potential of the earth pattern of the front end circuit will be finally the ground potential different from the potential of the chassis 76. This is because a relatively long earth line is formed between the earth of the front end circuit and the chassis 76 and has a high impedance. Further, the signal terminal of the coaxial cable 72 also is connected to the antenna input terminal of the front end circuit by a relatively long signal line.

Partly since the impedance in the earth line of the antenna input is increased, and partly since the signal line for the antenna input also is long, the oscillation output of the local oscillating circuit would be radiated out from such long signal line so that so-called unnecessary high frequency radiation would occur, thus causing jamming.

According to the structure of FIG. 5, the signal line and earth line for antenna signals are formed along a long pattern formed in the substrate 100 as a thin film so that the impedance of the earth line is high. In practice, therefore, if reticular wires 116 were not soldered between the shield case 114 of the front end pack 110 and the earth tube 90a of the antenna jack 90, the above-mentioned unnecessary high frequency radiation could not be prevented.

Another problem with the conventional structures of FIGS. 4 and 5 is that tracking adjustment solely for the front end circuit itself cannot be conducted under the same conditions as actual using conditions. Specifically, in either structure of FIGS. 4 and 5, while adjustment is made solely for the front end circuit, the antenna jack 70 or 90 to be used in an actual apparatus assumes a disconnected posture. Consequently, it was inevitable that a pin for antenna input was mounted on the substrate of the front end circuit to conduct adjustment while antenna input was made to the pin.

SUMMARY OF THE INVENTION

It is an object of this invention to provide a structure which effectively prevents unnecessary high-frequency wave radiation from a local oscillator in a front end circuit and which can make adjustment under substantially the same conditions as actual using conditions in a front end unit or a tuner unit.

Another object of the invention is to provide a radio receiver for vehicle, which requires almost no tracking readjustment after a tuner whose tracking has been adjusted is assembled in the radio receiver.

According to the invention, there is provided a tuner for converting antenna input signals into audio signals, comprising: a tuner circuit substrate on which an earth pattern and various signal patterns are formed; tuner circuit components supported on the tuner circuit substrate and connected to the earth and signal patterns; a signal input/output connector supported on the tuner circuit substrate; a shield case connected to the earth pattern and fixed to the tuner circuit substrate and surrounding, among the tuner circuit components, FM wave front end circuit components which constitute a high frequency amplifying circuit, a mixing circuit and a local oscillating circuit; an antenna jack including an earth tube, and a signal terminal insulated from the earth tube and connected to the antenna input signal pattern of the tuner circuit substrate; and a jack attachment plate constituted by an extension of the shield case and supporting the earth tube of the antenna jack forced in the attachment plate.

Preferably, the antenna jack is mounted on the tuner circuit substrate on which the front end circuit is supported. Since the signal terminal of the antenna jack is directly connected to the antenna input pattern of the substrate, it is possible to set a distance to a minimum between the signal terminal of the antenna jack and the antenna input terminal of the font end circuit, namely, the length of the signal line. The earth tube of the antenna jack is forced and fixed in the shield case whose potential is equal to the earth potential of the front end circuit. It is therefore possible to reduce the earth line of the antenna input to a minimum and hence to reduce the impedance of the earth line, which is to be formed by the shield case having a thickness adequately larger than that of the substrate pattern. Thus, unnecessary high-frequency waves from the local oscillator in the front end circuit will not be radiated from the relatively short-distance signal line.

Further, since the antenna jack is mounted on the tuner circuit substrate on which the front end circuit is supported, it is possible to use the antenna jack when making adjustment of the front end circuit. It is therefore possible to make adjustment of the front end circuit under substantially the same using conditions of the front end unit adjustment can be made stably, thus reducing occurrences of misadjustment remarkably.

Alternatively, the tuner circuit substrate may include a first circuit substrate supporting the antenna jack, the front end circuit components and the shield case, and a second circuit substrate supporting the FM wave and AM wave tuner circuit components except the front end circuit components, the first and second circuit substrates having cuttable portions, the connector supported on the tuner circuit substrate including a first connector supported by the first circuit substrate, and a second connector supported by the second circuit substrate, there being a signal input/output cable extending between the first and second circuit substrates.

With this structure, by performing the automatic parts inserting step, the automatic soldering step and the tracking adjusting step with the first and second circuit substrates in a unitary form and then dividing the first and second circuit substrates, it is possible to arrange the first and second circuit substrates in an equipment at respective different positions, causing an increased degree of freedom for layout of the circuit substrates in the equipment.

In another alternative form, the front end circuit components may include an FM wave tuning variable capacitance diode whose capacitance value varies according to a voltage applied, the AM wave tuner circuit components including an AM wave tuning variable capacitance diode whose capacitance value varies according to a voltage applied, the tuner circuit substrate supporting a memory for storing tracking data corresponding to the applied voltage to each of the FM wave and AM wave tuning variable capacitance diodes for each of a plurality of kinds of frequencies and a constant voltage supply circuit for setting up a reference value for the applied voltage to each the variable capacitance condenser, the connector including an input terminal for a voltage to be applied to each variable capacitance diode, an input/output terminal for data to the memory, and an output terminal for voltage to the constant voltage supply circuit.

With this arrangement, in both tracking adjustment and actual using, it is possible to set a reference voltage for the voltage to be applied to the variable capacitance diode, by the reference voltage of the constant voltage supply circuit in the tuner. Therefore, substantially the same sensitivity as that in tracking adjustment can be obtained in actual use. As a result, after native tracking data of the tuner has been stored in the memory of the tuner during tracking adjustment, it is almost unnecessary to convert the tracking data.

Also with the radio receiver for a vehicle, in which the tuner having the foregoing features is incorporated, it is possible to use these features of the tuner with almost no need of tracking readjustment so that any unnecessary high-frequency waves will not be radiated. If the first and second circuit substrates of the tuner circuit substrate are arranged separately in the chassis, it is possible to increase the degree of freedom for parts layout.

Further, because radiation of unnecessary high-frequency waves is the problem with the FM wave front end, the front end circuit and the antenna jack may be mounted on the same substrate as a front end unit.

DETAILED DESCRIPTION

A tuner according to one embodiment of this invention will now be described in detail with reference to the accompanying drawings.

Figure 3:
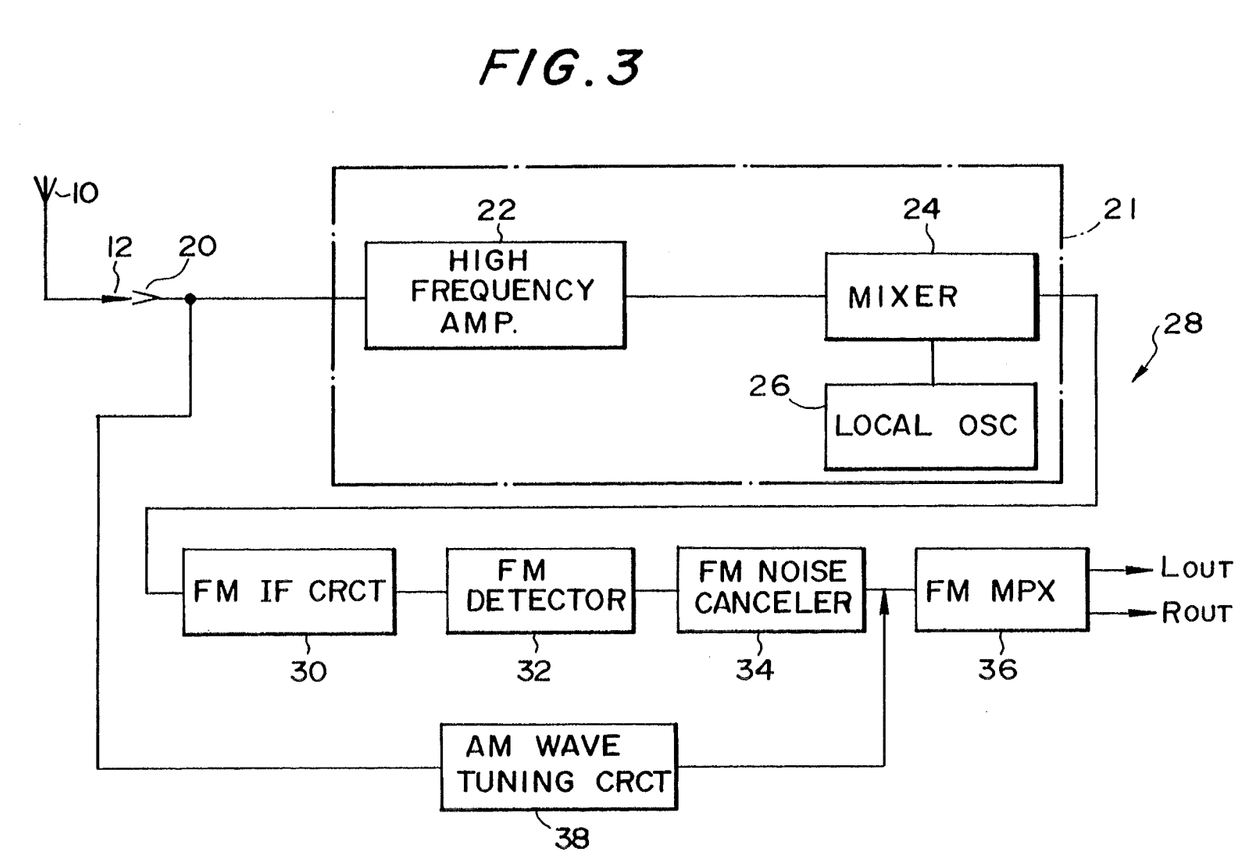
FIG. 3 is a block diagram showing various circuits mounted in the front end unit of FIG. 1.

FIG. 3 is a block diagram showing the tuner of this embodiment. The tuner of this embodiment is mounted in a radio receiver for a vehicle, there being mounted on the vehicle an antenna plug 12 connected to an antenna 10. In the tuner mounted in the radio receiver, an antenna jack 20 is detachably attached to the antenna plug 12. The tuner also includes a high frequency amplifying circuit 22 to which an antenna signal input from the antenna jack 20 is to be inputted. At the back stage of the high frequency amplifying circuit 22, a mixing circuit 24 for mixing the output of the high frequency amplifying circuit 22 in frequency with the output of a local oscillating circuit 26 to output an intermediate frequency signal is situated. Generally, the high frequency amplifying circuit 22, the mixing circuit 24 and the local oscillating circuit 26 constitute a front end circuit 21.

Assuming that fr is the receiving frequency to be outputted from the high frequency amplifying circuit 22, f0 is the oscillation frequency from the local oscillating circuit 26, and fi is the intermediate frequency, the oscillation frequency f0 from the local oscillating circuit 26 is obtained by the following equation:

$$f0 = fr \pm fi.$$

The oscillation frequency f0 from the local oscillating circuit 26 is fixed, for example, in a non-illustrated PLL circuit. When the individual frequencies f0 and fr are mixed in the mixing circuit 24, an intermediate frequency fi will be outputted from the mixer 24. The front end circuit 21 consisting of the high frequency amplifying circuit 22, the mixing circuit 24 and the local oscillating circuit 26 converts a high frequency input signal from the antenna jack 20 into an intermediate frequency signal.

In the tuner of this embodiment, the following circuits, in addition to the front end circuit 21, are mounted. Namely, at the back stage of the mixing circuit 24, there are situated an FM intermediate frequency circuit 30, an FM detecting circuit 32, an FM noise canceler 34 and an FM multiplexer 36, which outputs an L signal and an R signal. These circuits and the front end circuit 21 constitute an FM tuner circuit 28.

Further, in the tuner of this embodiment, am AM wave tuner circuit 38 is also mounted. When an antenna signal is input from the antenna jack 20, the ,AM wave tuner circuit 38 will output an AM detection signal to the FM multiplexer 36.

Figure 1:
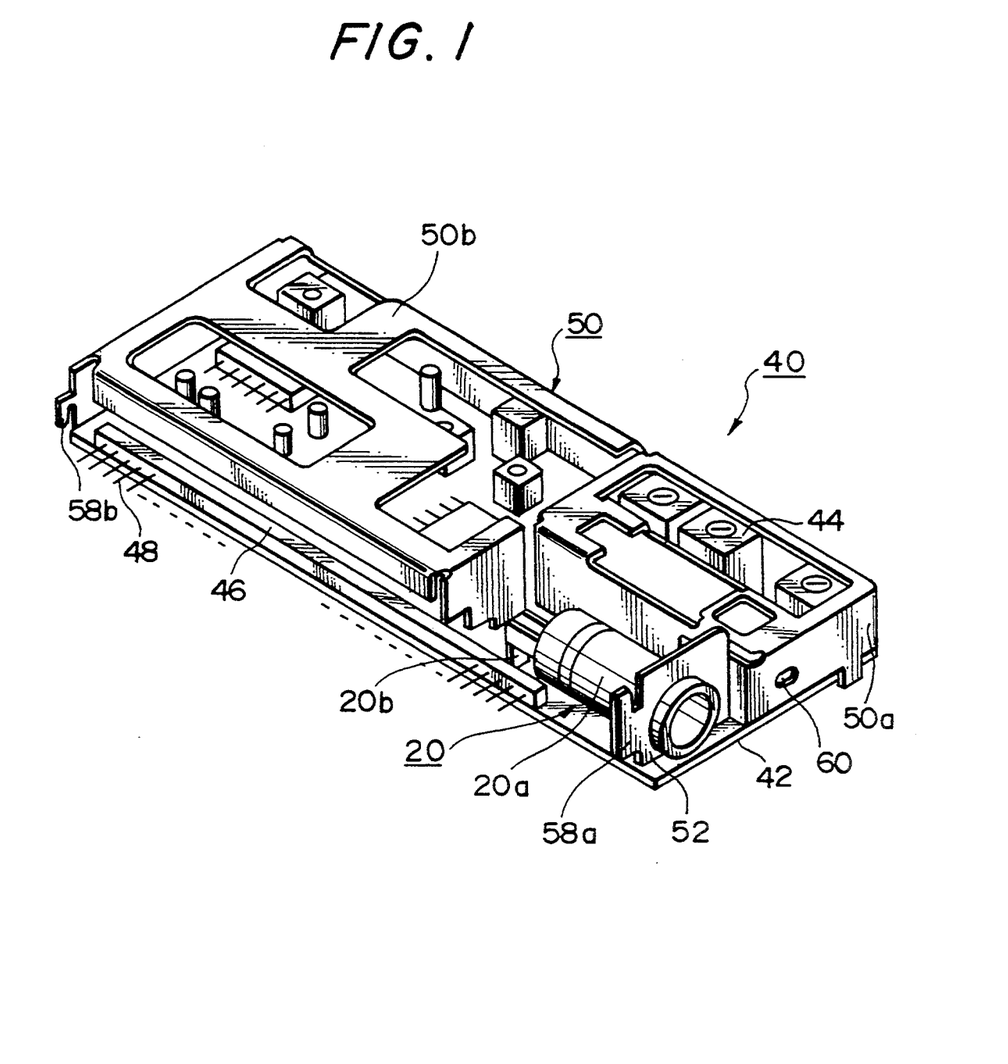
FIG. 1 is a fragmentary perspective view showing a front end unit according to one embodiment of this invention.

The structure of the tuner in which the foregoing individual circuits are mounted will now be described with reference to FIGS. 1 and 2.

The tuner of this embodiment is in the form of a tuner pack 40. The tuner pack 40 includes the antenna jack 20, components 44 constituting the above-mentioned circuits, a connector 46 for connecting the tuner to another substrate, and a shield case 50.

The shield case 50 is divided into two: a first shield case 50a covering the region for the high frequency amplifying circuit 22, the mixing circuit 24 and the local oscillating circuit 26, which constitute the front end circuit 21; and a second shield case 50b covering the region for the other circuits. The antenna jack 20 is forced in and supported by a jack force-in plate 52 extending integrally from the first shield case 50a for the front end. The antenna jack 20 includes an earth tube 20a and a signal terminal 20b insulated from the earth tube 20a. Part of the earth tube 20a is forced in a force-in hole 54 of the jack force-in plate 52. The jack force-in plate 52 has, under the force-in hole 54, an earth terminal 58a projecting from the lower surface of the plate 52. The earth terminal 58a is soldered directly to an earth pattern formed on the back surface of the tuner circuit substrate 42 (FIG. 2).

Figure 2:
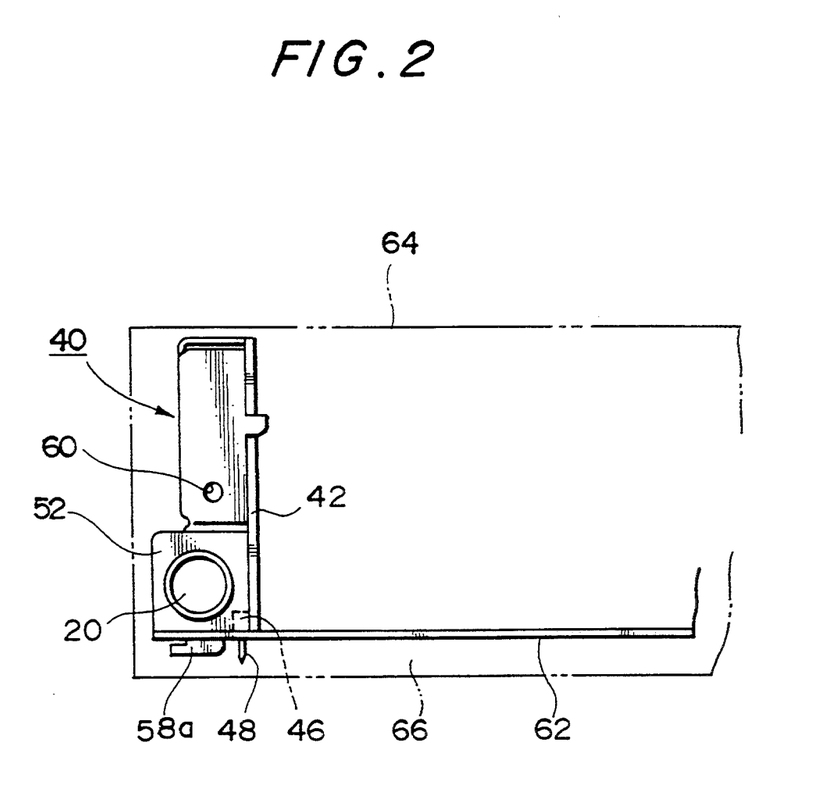
FIG. 2 is a diagram showing the position in which the front end unit of FIG. 1 is arranged in a chassis.

After having been adjusted and inspected solely, the tuner pack 40 is fixedly attached vertically to a main circuit substrate 62 parallel to the bottom surface of a chassis 64, as shown in FIG. 2. In order to input and output signals between the main substrate 62 and the tuner circuit substrate 42, a pin 48 of the connector 46 mounted on the tuner pack 40 is inserted into and soldered to a hole (not shown) formed in the main circuit substrate 62. In order to attach the tuner pack 40 to the main circuit substrate 62, the tuner pack 40 has at opposite ends respective attachment strip 58a, 58b formed on the first and second shield cases 50a, 50b.

One attachment strip 58a is formed on the end of the jack force-in plate 52. The individual attachment strip 58a, 58b is inserted into a square hole (not shown) formed in the main circuit substrate 62 and is soldered to the earth pattern formed around the square hole. Further, the first shield case 50a has an attachment hole 60 for a screw to extend to fasten the first shield case 50a to the rear surface 66 of the chassis 64. The second shield case 50b may be omitted.

As a result, the earth pattern formed on the tuner circuit substrate 42 of the tuner pack 40 is set to the ground potential via the first shield case 50a and chassis 64. When the tuner pack 40 is thus attached to the main circuit substrate 62 and fastened to the rear surface 66 of the chassis 64 by the screw, a jack opening of the antenna jack 20 mounted on the tuner pack 40 will be located confronting a predetermined position in the rear surface 66 of the chassis 64. The rear surface 66 has a cutout at the predetermined position.

A first advantageous feature of the tuner pack 40 supporting the antenna jack 20 is that various kinds of adjustments such as tracking adjustment can be performed under substantially the same conditions as actual using conditions. Specifically, for tracking, the antenna plug is inserted into the antenna jack 20 mounted on the tuner pack 40 and a necessary input/output terminal is connected to the connector 46. As a necessary reference frequency for tracking adjustment is generated from a non-illustrated signal generator, both the capacitance of a condenser for the local oscillating circuit 26 and the capacitance of a condenser for the high frequency tuning circuit as well as the antenna constituting the high frequency amplifying circuit 22 will be adjusted so as to achieve predetermined tracking. Alternatively, each of the foregoing condensers may be a voltage-controlled variable capacitance condenser, with which a voltage to be applied for various kinds of predetermined frequencies will be adjusted. In this case, since antenna input can be performed by the commercially available antenna jack 20, without using the pin formed on the substrate only for adjustment such as tracking adjustment as conventional, it is possible to achieve tracking adjustment with higher precision.

As another advantageous feature of the tuner pack 40, it is possible to prevent radiation of unnecessary high frequency effectively.

More specifically, having an eye firstly to the signal line of the antenna input, the front end circuit and the antenna jack 20 are mounted on the common circuit substrate 42, and the signal terminal 20b of the antenna jack 20 is soldered directly to the signal pattern formed on the rear surface of the substrate 42. Since the signal line can be formed using the pattern in the same substrate without drawing about a wire as usual, it is possible to reduced the signal line to a minimum.

Secondly, having an eye to the earth line of the antenna input, the earth line can be reduced to a shortest, so the impedance can be limited to a minimum. The earth tube 20a of the antenna jack 20 is connected directly to the jack force-in plate 52 extending integrally from the first shield case 50a for determining the earth potential of the front end circuit. Part of the jack force-in plate 52 as the earth terminal 58a is soldered directly to the earth pattern of the circuit substrate 42.

Therefore, the earth tube 20a of the antenna jack 20 will be set to substantially the same potential as the earth potential of the front end circuit 21 instantly at the mouth of the antenna input of the front end circuit 21. This action is secured by connecting the earth terminal 58a of the jack force-in plate 52, into which the earth tube 20a has been forced, directly to the earth pattern of the tuner circuit substrate 42 supporting the front end circuit 21. In this case, the earth pattern of the tuner circuit substrate 42 and the jack force-in plate 52 constitute the earth line. However, the earth pattern of the tuner circuit substrate 42 on which both the antenna jack 20 and the front end circuit 21 are mounted can be made adequately shorter than conventional. Since the jack force-in plate 52a can have an adequately large thickness compared to the pattern thickness of the jack force-in plate 52a, it is possible to reduce the impedance in the earth line by an adequate value. Since both the antenna jack 20 and the front end circuit 21 are mounted on the tuner circuit substrate 42, it is possible to make the earth line adequately shorter than conventional ways. Thus, partly since the impedance in the earth line at the antenna input can be reduced adequately, and partly since the length of the signal line can be made smaller, unnecessary high frequencies such as the output f0, 2f0, 3f0 generated from the local oscillating circuit 26 in the front end circuit 21 and leaked out of the signal line adequately can be reduced.

In the case of the radio receiver, the earth of the front end circuit 21 is finally set to the ground potential via the chassis 64. At that time, according to this embodiment, the first shield case 50a mounted on the tuner pack 40 is fastened to the rear surface 66 of the chassis 64 by a screw. Therefore both connection of the earth tube 20a of the antenna back 20 to the earth terminal of the front end circuit and connection of the earth terminal of the front end circuit 21 to the chassis can be realized at one position of the first shield case 50a, so the impedance in the earth line for setting the potential to the ground potential can be reduced effectively, thus effectively minimizing the above-mentioned unnecessary radiation.

This invention should by no means be limited to the foregoing embodiment, and various modifications may be suggested within the scope of this invention. In the foregoing embodiment, the FM intermediate frequency circuit 30, the FM detecting circuit 32, the FM noise canceler 34, the FM multiplexer 36 and the AM wave tuner circuit 38, in addition to the high frequency amplifying circuit 22, the mixing circuit 24 and the local oscillating circuit 26 which constitute the front end circuit 21, are mounted on the substrate 42 of the tuner pack. The result of this invention is that adjustment such as at least tracking adjustment for the front end unit can be made solely with the tuner under the same conditions as actual using conditions and that unnecessary radiation from the local oscillating circuit 26 in the front end unit can be prevented. Alternatively, in the case of the front end unit, all components to be mounted on the substrate 42 may be the antenna jack 20 and the circuits 22, 24, 26 constituting the front end circuit 21.

Figure 6:
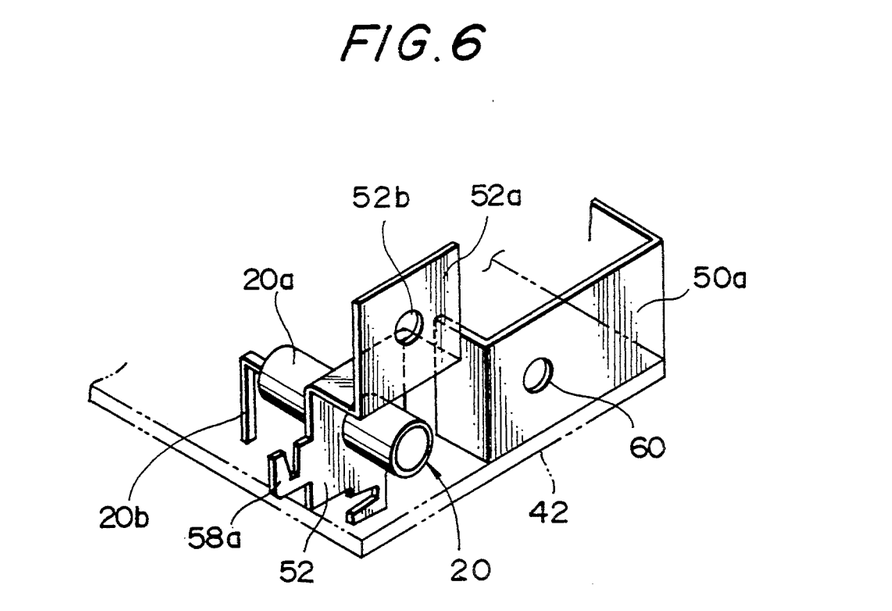
FIG. 6 is a fragmentary perspective view showing a modification in which a shield case and a jack attachment plate are separate members.

On the tuner circuit substrate 42, the jack force-in plate 52 supporting the antenna jack 20 should by no means be limited to the extension of the first shield case 50a surrounding the front end circuit 21. FIG. 6 shows a modification in which the jack force-in plate 52 is separate from the first shield case 50a. This jack force-in plate 52 has an attaching position 52a flush with the side surface of the first shield case 50a at which side the first shield case 50a is fixed to the rear surface 66 of the chassis 64. The attachment plate 52 has an attachment hole 52b for a screw to extend to fasten the attachment plate 52a to the chassis 64.

In the embodiment of FIG. 6, though the number of components is increased, it is possible to reduce, likewise the previous embodiment, the impedance in the earth line of the antenna jack 20 and also to make the earth line adequately shorter than conventional ways. Accordingly it is possible to effectively minimize unnecessary radiation from the local oscillating circuit 26.

Figure 7:
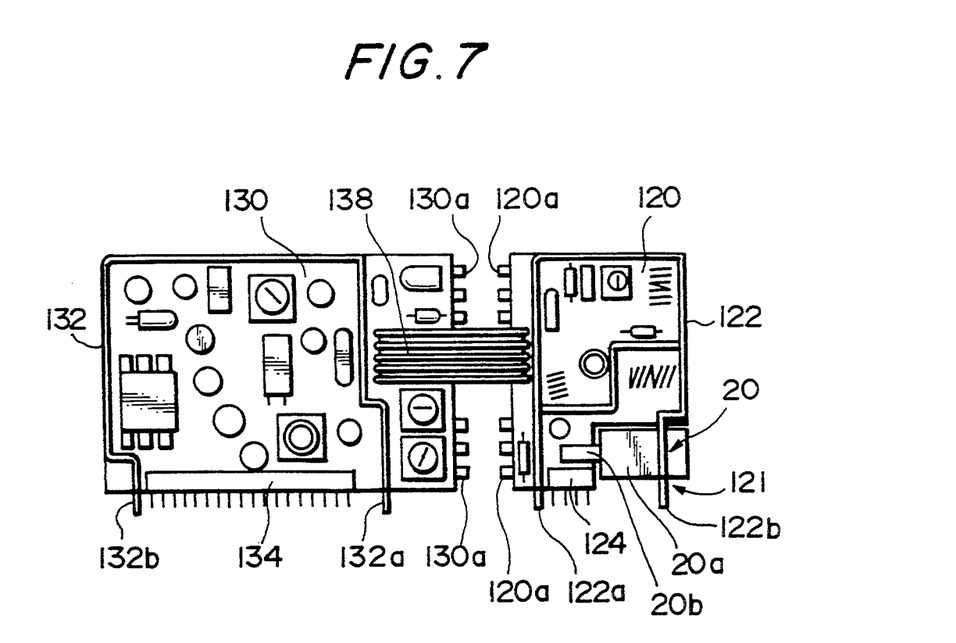
FIG. 7 is a fragmentary plan view showing another modification in which a tuner circuit substrate is divided into first and second circuit substrates.

FIG. 7 shows another modification of the tuner circuit substrate 42. In the embodiment of FIG. 7, the tuner circuit substrate 42 is in the form of a double-substrate structure including a first circuit substrate 120 for the front end circuit 21 and a second circuit substrate 130 for the remaining circuits. The first and second circuit substrates 120, 130 are originally united as a single substrate by confronting connecting strips 120a, 130a and will be cut into two substrates afterwards manually.

On the first circuit substrate 120, the components for the front end circuit 21 of FIG. 3 are mounted, and a first shield case 122 covering these components is mounted. Further, a first connector 124 is mounted on the first circuit substrate 120 for signal input and output between the main circuit substrate 62 and the first circuit substrate 120. The first shield case 122 has attachment strips 122a, 122b projecting from the end of the first circuit substrate 120. By the individual attachment strips 122a, 122b and the pin of the first connector 124, it is possible to attach the first circuit substrate 120 vertically on the main circuit substrate 62.

On the second circuit substrate 130, the circuits or components (30–38) other than the front end circuit 21 of FIG. 3, and a second shield case 132 covering these components is mounted. Further, a second connector 134 is mounted on the second circuit substrate 130, like the first circuit substrate 120, for signal input and output between the second circuit substrate 130 and the main circuit substrate 62. The second shield case 132 serves as an attachment member chiefly to attach the second circuit substrate 130 vertically on the main circuit substrate 62. The second shield case 132 has at opposite ends a pair of attachment strips 132a, 132b to be inserted into the main circuit substrate 62.

Further, for signal input and output between the first and second circuit substrates 120, 130, a parallel-line cable 138, for example, is connected between the two substrates. The first and second circuit substrates 120, 130 are united as a single substrate until tracking adjustment for AM and FM has been ended, whereupon it will be divided into two before being mounted on the main circuit substrate 62. Therefore it is possible to deal with these two substrates as a single substrate while performing both the step of automatically inserting the components into the first and second circuit substrates 120, 130 and the step of automatically soldering these components. Since the antenna jack 20 is forced into the jack force-in plate likewise the previous embodiment, it is possible to achieve tracking adjustment under the same conditions as actual using conditions.

Figure 8:
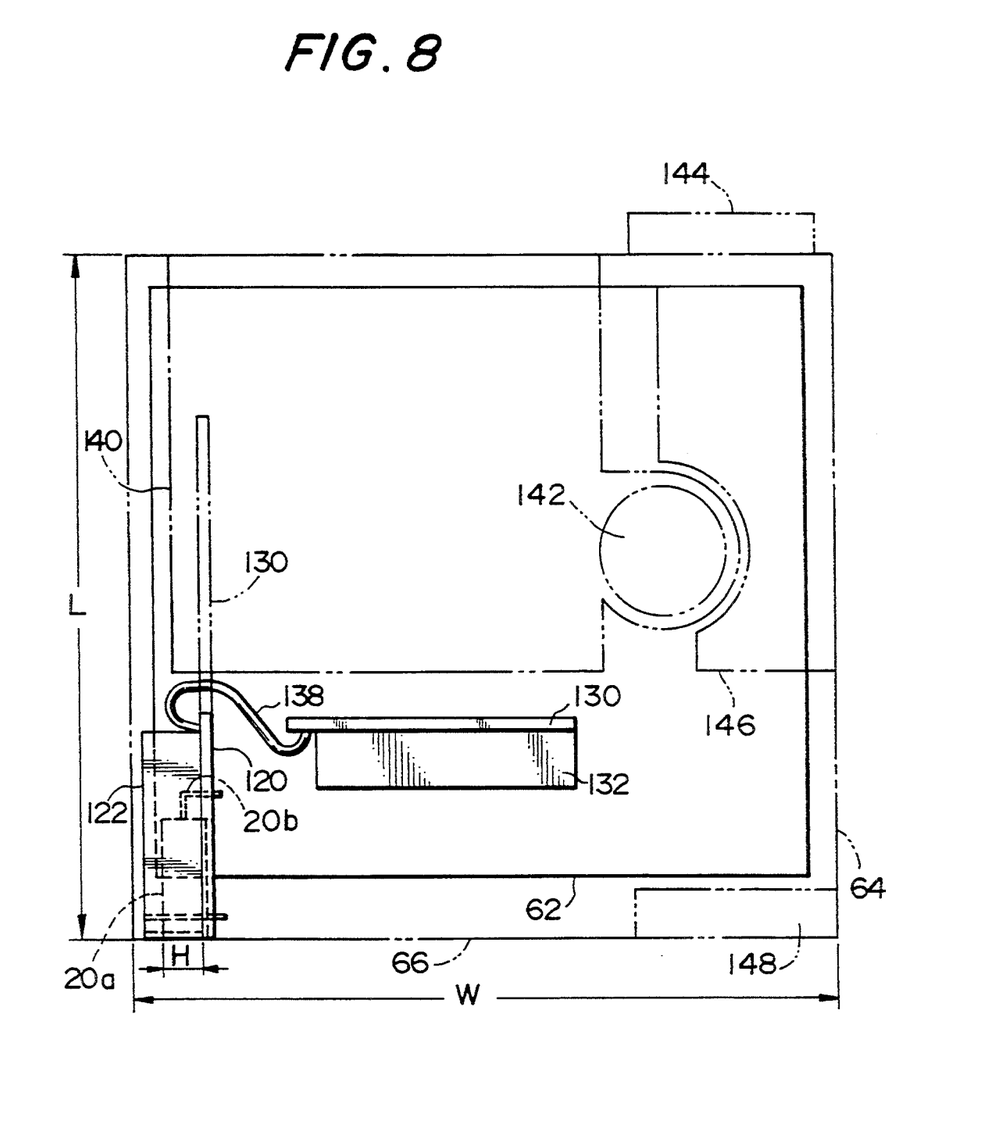
FIG. 8 is a fragmentary plan view showing an example of layout in which the first and second circuit substrates are arranged in different positions in a chassis.

FIG. 8 shows an example of layout in which the first and second circuit substrates 120, 130 divided are arranged on the main circuit substrate 62 supported on the chassis 64. The apparatus shown in FIG. 8 is a radio receiver for a vehicle carrying a cassette tape player 140. The first circuit substrate 120 is situated in such a manner that the antenna jack 20 is position at the left end portion of the first circuit substrate 120 as viewed from the rear surface 66 of the chassis 64. Further, the first and second circuit substrates 120, 130 are arranged between the cassette tape player 140 and the rear surface 66 of the chassis 64. According to such layout, it is possible to situate the cassette tape player 140 in a position shifted to the left in FIG. 8, compared to the case in which the first and second circuit substrates 120, 130 are in the form of a single substrate as indicated by chain lines in FIG. 8. As a result, it is possible to situate a display means, such as an LCD 144, which is to be situated on the front side of the apparatus, in a relatively large region on the right side of the apparatus in FIG. 8. In this case, the cassette tape player 140 must be situated in a position shifted to the right in FIG. 8 so as not to interfere with the cassette tape player 140.

Conventionally, in the cassette tape player 140, a motor 142 is situated in a position projecting from the side surface, e.g., the right side surface of the player body 140 in order to make the depth of the player 140 shorter than the depth L of the standardized apparatus. With existence of the motor 142, the extent to which the player 140 can be shifted to the right is limited. In this conventional arrangement, the region to be left on the right and left sides of the cassette tape player 140 would be smaller, so the width of the LCD 144 had to be short.

Whereas in this embodiment, the LCD 144 can have a relatively large screen within a range of the width W of the standardized apparatus, thus increasing the degree of freedom for layout of the front side of the apparatus. In FIG. 8, a power IC circuit 146 is situated on the right side of the cassette tape player 140, while a connector 148 is situated on the rear side of the player 140. Since the cassette tape player 140 can be shifted to the left in FIG. 8, it is possible to increase the degree of freedom of the region for installation of the power IC circuit 146.

For situating the first circuit substrate 120 in a position shifted to the left of the apparatus in FIG. 8, a cutout 121 may be formed in part of the first circuit substrate 120 at a region confronting the earth tube 20a of the antenna jack 20, as shown in FIG. 7.

With this structure, as shown in FIG. 8, it is possible to make the pattern side surface of the first circuit substrate 120 substantially flush with the circumferential surface of the earth tube 20a of the antenna jack. Therefore it is possible to reduce the height H between the first circuit substrate 120 and the top of the earth tube 20a. By using the circuit components 44 having a height within the height H from the first circuit substrate 120, it is possible to situate the first circuit substrate 120 in a position shifted to the left of the apparatus.

The circuits to be mounted on the tuner circuit substrate 42 of FIG. 3 and on the main circuit substrate 62 of FIG. 2 will now be described with reference to FIG. 9.

As mentioned above, the front end circuit 211 to be mounted on the tuner circuit substrate 42 includes a high frequency amplifying circuit 22, a mixing circuit 24 and a local oscillating circuit 26. The high frequency amplifying circuit 22 is composed chiefly of an antenna tuning circuit 150 and an RF tuning circuit 154. In the antenna tuning circuit 150, the RF tuning circuit 154 and the local oscillating circuit 26, there are mounted first, second and third variable capacitance diodes 152, 156, 158, respectively, the capacitance value of each of which is variable according to the applied voltage. First, second and third voltage applying terminals 160, 162, 164 respectively connected to the first, second and third variable capacitance diodes 152, 156, 158 are mounted on the connector 46 mounted on the tuner circuit substrate 42. On the connector 46, an output terminal 166 of the local oscillating circuit 26 is mounted.

On the tuner circuit substrate 42, a memory such as an electrically erasable programmable ROM 170 and a constant voltage supply circuit 172, in addition to the individual circuits 30-38 other than the front end circuit 21 of FIG. 3, are mounted. In EEPROM 170, tracking data determining the individual applied voltages to the first and second variable capacitance diodes 152, 156 when optimum tracking takes place at different frequencies is stored as, for example, 8-bit data. The constant voltage supply circuit 172 sets a reference potential for the applied voltage to the first and second variable capacitance diodes 152, 156. In this embodiment, the reference potential is 8.8 V. Assuming that 8-bit tracking data for the first and second variable capacitance diodes 152, 156 are A1 and B1, respectively, with respect to a frequency fl, The applied voltage to the first variable capacitance diode $152 = 8.8 \times A1/256$ (V)

The applied voltage to the first variable capacitance diode $156 = 8.8 \times B1/256$ (V).

Figure 10:
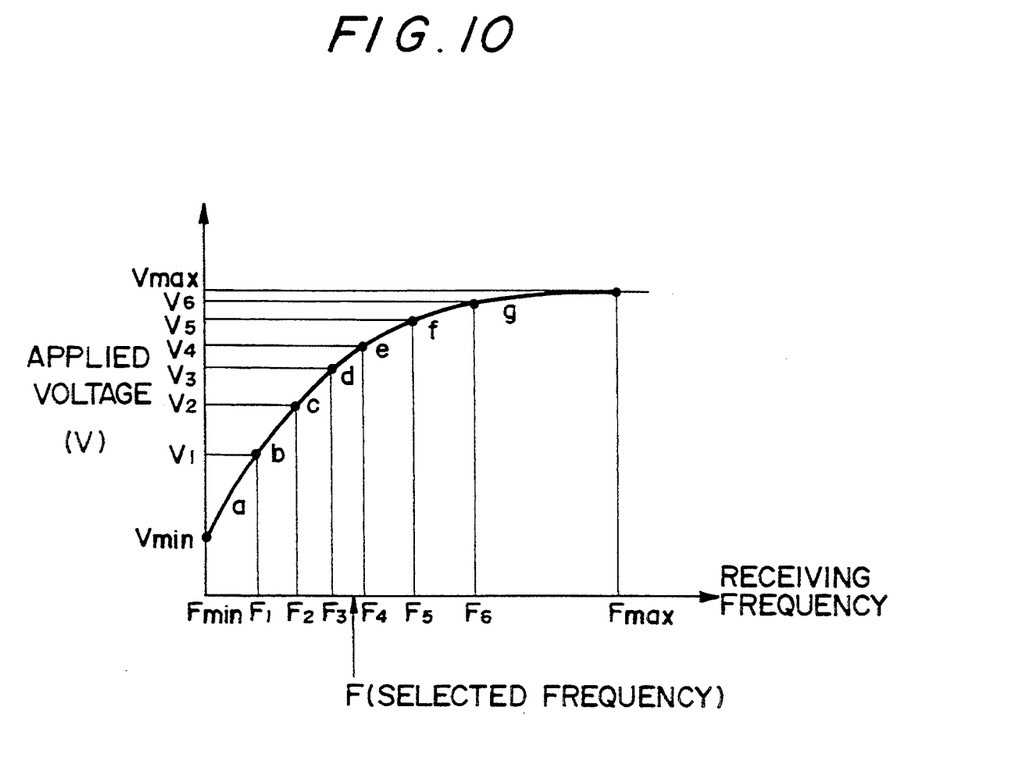
FIG. 10 is a characteristic graph showing the relationship between voltage applied to a tuning variable capacitance diode and tuning frequency.

The relationship between the applied voltage to the variable capacitance diode is as shown in FIG. 10. In FIG. 10, the applied voltages Vmin—Vmax to the diode when tracking adjustment takes place for every frequency at different points between frequencies Fmin—Fmax can be obtained. The tracking data to be stored in EEPROM 170 will be 8-bit data corresponding to the applied voltage Vmin—Vmax for every diode 152, 156.

The reason why the memory mounted on the tuner circuit substrate 42 is an EEPROM 170 is that the memory stores data other than tracking data, namely, memory information which is necessary to a radio receiver for vehicle and is required to be rewritten. When storing data for digital tuning, the memory is an EEPROM 170 so that preset data such as desired receiving frequencies can be rewritten.

The connector 46 mounted on the tuner circuit substrate 42 is equipped with an input/output terminal 174 for EEPROM 170 and an output terminal 176 of the constant voltage supply circuit 172.

On the main circuit substrate 62, a microcomputer 180 for controlling a digital tuning system is mounted. When selecting an arbitrary frequency F shown in FIG. 9, the microcomputer 180 reads from EEPROM 170 tracking data relating to V3 and V4 corresponding to frequencies F3 and F4 about the frequency F and obtains data for the applied voltage V at the arbitrary frequency F by interpolation computing. The microcomputer 180 applies voltages, which are to be determined by the above-mentioned equations based on the obtained data, to the respective diodes 152, 156 of the antenna tuning circuit 150 and the RF tuning circuit 154 via first and second low-pass filters 182, 184 and the first and second voltage applying terminals 160, 162.

The microcomputer 180 has a built-in phase locked loop (PLL) 188. The PLL 188 locks the transmitting frequency of the local oscillating circuit 26 to the sum frequency of, for example, the receiving frequency fr and the intermediate frequency fl. The output of the PLL 188 is applied to the third variable capacitance diode 158 of the local oscillating circuit 26 via a third low-pass filter 186 and a third voltage applying terminal 164.

Figure 9:
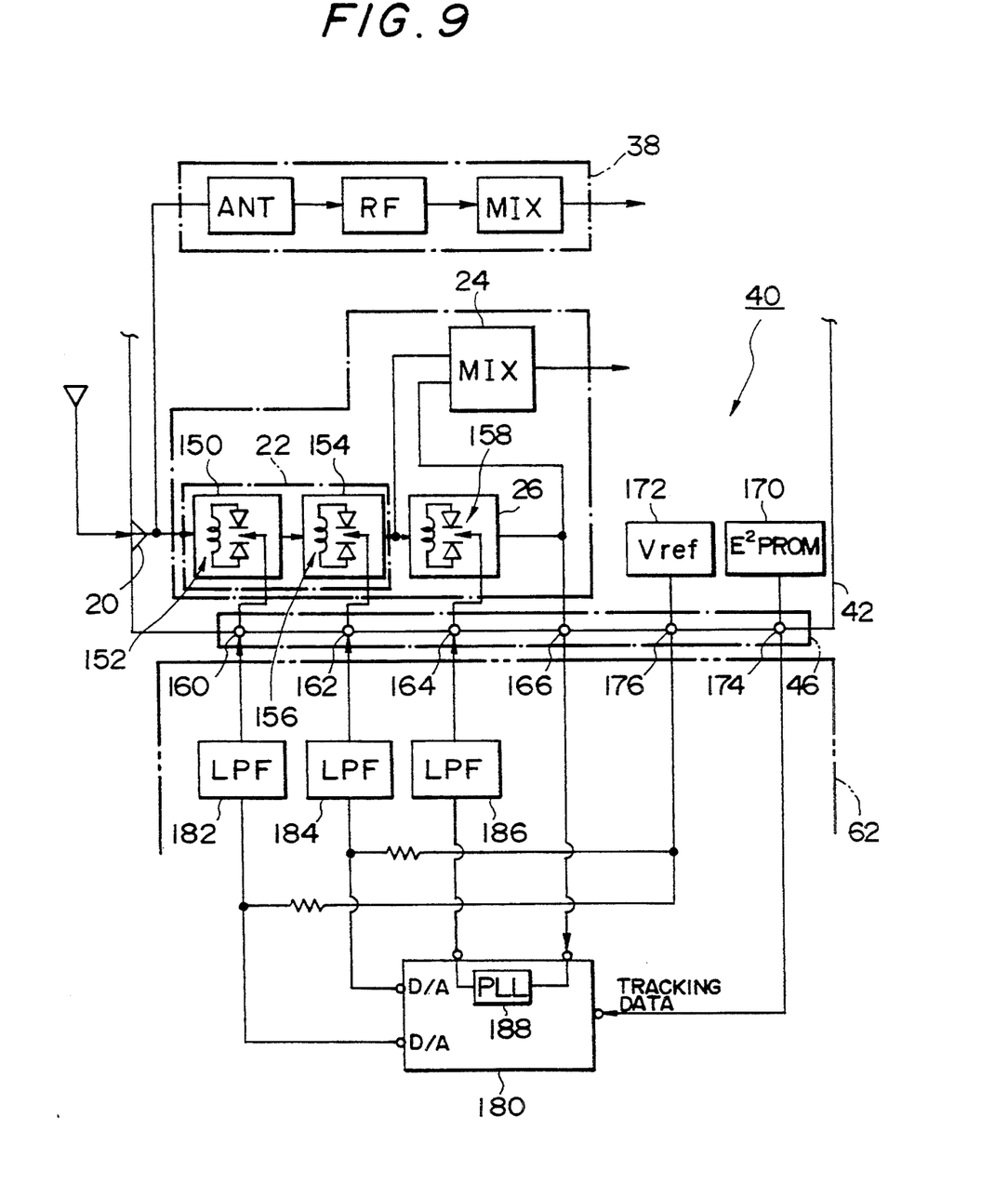
FIG. 9 is a block diagram showing the manner in which a memory and a constant voltage supply circuit are mounted on the tuner circuit substrate while a microcomputer is mounted on a main circuit substrate.

In the tuner pack 40 in which EEPROM 170 and the constant voltage supply circuit 172, in addition to the front end circuit 21 and the AM wave tuning circuit 38, are mounted on the tuner circuit substrate 42 of FIG. 9, tracking adjustment takes place for the tuner pack 40 itself separately from the main circuit substrate 62. Therefore, during that time, a tracking adjustment unit having the functions for the microcomputer 180 mounted on the main circuit substrate 62 and also for the first, second and third low-pass filters 182, 184, 188 are used. After this tracking adjustment, the tracking data corresponding to appropriate applied voltages to the first and second variable capacitance diodes 152, 156 of the antenna tuning circuit 150 and the RF tuning circuit 154 are stored in EEPROM 170 in the tuner pack 40. This appropriate applied voltage is detected using a reference potential (e.g., 8.8 V) of the constant voltage supply circuit 172 mounted in the tuner pack 40.

As mentioned above, the applied voltages to the first and second variable capacitance diodes 152, 156 are determined according to the above-mentioned equations, using the reference potential of the constant voltage supply circuit 172. If this reference potential is set using the reference potential of the constant voltage supply circuit, for example, in a tracking adjustment unit outside the tuner pack 40, following problems would occur. Assuming that the tuner pack 40 is incorporated in the radio receiver, the reference potential will be determined using the constant voltage supply circuit mounted on the main circuit substrate rather than that mounted in a tracking adjustment unit. In this case, if there is a slight difference in reference potential between the constant voltage supply circuit of the tracking adjustment unit and that mounted on the main circuit substrate, the applied voltage to the first and second variable capacitance diode 150, 156 to be determined according to the above-mentioned equations will be different from the voltage during tracking adjustment.

According to this embodiment, since both the reference potential in tracking adjustment and that in actual using is determined by the reference potential of the constant voltage supply circuit 172 in the tuner pack 40, it is possible to prevent the applied voltage from being different between in tracking adjustment and in tuning in actual using. If there is a difference in applied voltage, so-called mistuning will occur so that fine adjustment will become necessary again after the tuner pack 40 and the main circuit substrate 62 are mounted in the radio receiver. In this embodiment, after tracking adjustment has once been made solely for the tuner pack 40 itself, no readjustment will be required when the tuner pack 40 is incorporated in the radio receiver.

Mistuning when there is a difference in reference potential is particularly remarkable in the case of AM. Because, in the case of AM, Q of the variable capacitance diode of each of the antenna and the RF tuning circuit is steep, and the sensitivity would be lowered sharply when the applied voltage is slightly out of the reference voltage. Therefore, though not shown in FIG. 9, the microcomputer 180 on the main circuit substrate 62 may be designed so as to apply a voltage also to the variable capacitance diode of the high frequency amplifying circuit of the tuner circuit 38 in the tuner circuit substrate 42. In this case, it is only necessary to store also AM tuning tracking data in EEPROM 170 mounted on the tuner circuit substrate 42.

If the embodiment of FIG. 9 is to be used in the tuner in which the circuit substrate can be divided into the first and second circuit substrates 120, 130, both EEPROM 170 and the constant voltage supply circuit 172 are mounted on the first circuit substrate 130. Further, it is preferable that the terminals 160–166, 174, 176 are divided into two groups to be arranged on the first and second connectors 124, 134.

If both the memory in which tracking data is stored and the constant voltage supply circuit 172 for setting the reference potential-for applied voltage to the tuning variable capacitance diode are to be mounted on the tuner circuit substrate 42 or the second circuit substrate 130, it should by no means be necessary that the antenna jack 20 is mounted on the tuner circuit substrate 42 or the first circuit substrate 120. Because preciseness of tracking adjustment would be improved considerably as well, compared to the case in which there is a difference at least in reference potential between adjusting and in actual using.

What is claimed is:

1. A tuner for converting antenna input signals into audio signals; comprising:
   (a) a tuner circuit substrate having an earth pattern and various signal patterns including an antenna input signal pattern;
   (b) tuner circuit components supported on said tuner circuit substrate and connected to the earth and signal patterns, said tuner circuit components including FM wave front end circuit components mounted on said tuner circuit substrate;
   (c) a signal input/output connector supported on said tuner circuit substrate;
   (d) a sheild case set to an earth potential via a chassis and connected to the earth pattern, said sheild case fixed to said tuner circuit substrate to surround said FM wave front end circuit components, said front end circuit components comprising a high-frequency amplifying circuit, a mixing circuit and a local oscillating circuit;
   (e) an antenna jack having an earth tube and a signal terminal insulated from said earth tube, the signal terminal being connected to the antenna input signal pattern of said tuner circuit substrate; and
   (f) a jack attachment plate contacting said sheild case and supporting said earth tube of said antenna jack to form an electrical connection among said earth tube, said sheild case and said earth pattern of said tuner circuit substrate.

2. A tuner according to claim 1, wherein said tuner circuit components includes FM wave and AM wave tuner circuit components.

3. A tuner according to claim 2, wherein said tuner circuit substrate comprises:
   a first circuit substrate supporting said antenna jack, said front end circuit components and said sheild case, and
   a second circuit substrate supporting said FM wave and AM wave tuner circuit components except said front end circuit components, said signal input/output connector comprising a first connector on said first circuit substrate, a second connector on said second circuit substrate, and a signal input/output cable extending between said first circuit substrate and said second circuit substrate.

4. A tuner according to claim 2, wherein said front end circuit components further comprises an FM wave tuning variable capacitance diode having a capacitance value that varies according to a respectively applied voltage, said AM wave turner circuit components including an AM wave tuning variable capacitance diode having a capacitance value that varies according to a respectively applied voltage, said tuner circuit substrate supporting a memory for storing tracking data corresponding to the respective applied voltage to each of said FM wave and AM wave tuning variable capacitance diodes and a constant voltage supply circuit for setting a reference value for the respective applied voltage to said FM wave tuning variable capacitance diode and said AM wave tuning variable capacitance diode.

5. A tuner according to claim 4, wherein said memory is an erasable and programmable memory having a memory area for storing digital tuning data.

6. A tuner according to claim 3, wherein said front end circuit components includes an FM wave tuning variable capacitance diode having a capacitance value that varies according to a respectively applied voltage, said AM wave tuner circuit components including an AM wave tuning variable capacitance diode having a capacitance value that varies according to a respectively applied voltage, said tuner circuit substrate supporting a memory for storing tracking data corresponding to the respective applied voltage to each of said FM wave and AM wave tuning variable capacitance diodes and a constant voltage supply circuit for setting up a reference value for the respective applied voltage to each said variable capacitance diode.

7. A tuner according to claim 6, wherein said memory is an erasable and programmable memory having a memory area for storing digital tuning data.

8. A radio receiver for a vehicle comprising:
(A) a chassis set to an earth potential;
(B) a main circuit substrate in said chassis;
(C) a tuner supported by said main circuit substrate, said tuner comprising:
(a) a tuner circuit substrate having an earth pattern and signal patterns including an antenna input pattern;
(b) tuner circuit components supported on said tuner circuit substrate and connected to the earth pattern and the signal patterns, said tuner circuit components including FM wave front end circuit components mounted on said tuner circuit substrate;
(c) a sheild case connected to the earth pattern, and said sheild case fixed to said tuner circuit substrate and surrounding said FM wave front end circuit components, said front end circuit components comprising a high-frequency amplifying circuit, a mixing circuit and a local oscillating circuit;
(d) an antenna jack having an earth tube and a signal terminal insulated from said earth tube, said signal terminal being connected to the antenna input signal pattern of said tuner circuit substrate;
(e) a jack attachment plate contacting said sheild case and supporting said earth tube of said antenna jack to form an electrical connection among said earth tube, said sheild case and the earth pattern of said tuner circuit substrate; and
(f) a connector connecting the signal patterns of said tuner circuit substrate with signal patterns of said main circuit substrate, said connector supporting said tuner circuit substrate substantially perpendicular to said main circuit substrate, said sheild case being fixed at a rear side surface of said chassis, the rear side surface of said chassis having a cutout at one end portion, through which said antenna jack is exposed to the outside.

9. A radio receiver for a vehicle according to claim 8, wherein said tuner circuit components supported by said tuner circuit substrate includes FM wave tuning components and AM wave tuning components.

10. A radio receiver for a vehicle according to claim 9, wherein said tuner circuit substrate comprises:
a first circuit substrate supporting said antenna jack, said front end circuit components and said sheild case, and
a second circuit substrate supporting said FM wave and AM wave tuner circuit components except said front end circuit components, said connector comprising a first connector on said first circuit substrate, and a second connector on said circuit substrate, and a signal input/output cable extending between said first circuit substrate and said second circuit substrate, wherein sad first and second circuit substrates are supported in different positions on said main circuit substrate by said first and second connectors respectively, said first and second circuit substrates being supported substantially perpendicularly to said main circuit substrate.

11. A radio receiver for a vehicle according to claim 10, wherein one of a cassette player and a compact disc player is fixed to a front side of said chassis over said main circuit substrate, said first and second circuit substrates being supported on said main circuit substrate at a region between said one of the cassette player and the compact disc player and the rear side surface of said chassis.

12. A radio receiver for a vehicle according to claim 9, wherein said front end circuit components further comprises an FM wave tuning variable capacitance diode having a capacitance value that varies according to a respectively applied voltage, said AM wave tuner circuit components including an AM wave tuning variable capacitance diode having a capacitance value that varies according to a respectively applied voltage, said tuner circuit substrate supporting a memory for storing tracking data corresponding to the respective applied voltage to each of said FM wave and AM wave tuning variable capacitance diodes and a constant voltage supply circuit for setting up a reference value for the respective applied voltage to each of said FM wave and AM wave tuning variable capacitance diodes, wherein said main circuit substrate includes a control circuit for controlling digital tuning, said control circuit calculating, based on the tracking data in said memory, an optimum voltage to be applied to each of said variable capacitance diodes for an arbitrary received frequency and to set the voltage from said constant voltage supply circuit as a reference.

13. A radio receiver for a vehicle according to claim 12, wherein said memory is an erasable and programmable memory having a memory area for storing digital tuning data.

14. A radio receiver for a vehicle according to claim 10, wherein said front end circuit components includes an FM wave tuning variable capacitance diode having a capacitance value that varies according to respectively applied voltage, said AM wave tuner circuit components including an AM wave tuning variable capacitance diode having a capacitance value that varies according to a respectively applied voltage, said tuner circuit substrate supporting a memory for storing tracking data corresponding to the respective applied voltage to each of said FM wave and AM tuning variable capacitance diodes and a constant voltage supply circuit for setting up a reference value for the respective applied voltage to each of said variable capacitance diodes, wherein said main circuit substrate includes a control circuit mounted on said main circuit substrate for controlling digital tuning, said control circuit calculating, based on the tracking data in said memory, an optimum voltage to be applied to each of said variable capacitance diodes for an arbitrary received frequency and for setting the voltage from said constant voltage supply circuit as a reference.

15. A radio receiver for a vehicle according to claim 14, wherein said memory is an erasable and programmable memory having a memory area for storing digital tuning data.

16. A front end unit for converting FM wave antenna input signals into intermediate frequency signals, comprising:
   (a) a tuner circuit substrate having an earth pattern and signal patterns including an antenna input pattern;
   (b) front end circuit components mounted on said tuner circuit substrate and connected to the earth and signal patterns, said front end circuit components comprising a high-frequency amplifying circuit, a mixing circuit and a local oscillating circuit;
   (c) a signal input/output connector supported on said tuner circuit substrate;
   (d) a sheild case set to an earth potential via a chassis and connected to the earth pattern, said sheild case fixed to said tuner circuit substrate and surrounding said front end circuit components;
   (e) an antenna jack including an earth tube and a signal terminal insulated from said earth tube, said signal terminal being connected to the antenna input signal pattern of said tuner circuit substrate; and
   (f) a jack attachment plate contacting said sheild case and supporting said earth tube of said antenna jack to form an electrical connection among said sheild case, said earth tube and said earth pattern of said tuner circuit substrate.

17. A front end unit according to claim 16, wherein said shield has a hole adapted to receive a screw to fasten said sheild case to the chassis.

18. A front end unit according to claim 17, wherein said tuner circuit substrate has a cutout at a region confronting said earth tube, said antenna jack being mounted on said tuner circuit substrate to position part of said earth tube within a range of thickness of said tuner circuit substrate, and each of said front end circuit components having a height within a range between a surface of said tuner circuit substrate and a top end of said earth tube.

19. A front end unit for converting FM wave antenna input signals into intermediate frequency signals, comprising:
   (a) a tuner circuit substrate having an earth pattern and signal patterns including an antenna input signal pattern;
   (b) front end circuit components mounted on said tuner circuit substrate and connected to the earth and signal patterns, said first end circuit components comprising a high-frequency amplifying circuit, a mixing circuit and a local oscillating circuit;
   (c) a signal input/output connector supported on said tuner circuit substrate;
   (d) a shield case set to an earth potential via a chassis and connected to the earth pattern, said shield case fixed to said tuner circuit substrate and surrounding said front end circuit components;
   (e) an antenna jack having an earth tube and a signal terminal insulated from said earth tube, said signal terminal connected to the antenna input signal pattern of said tuner circuit substrate;
   (f) a jack attachment plate contacting said shield case and supporting said earth tube of said antenna jack to form an electrical connection among said earth tube, said shield case and said earth pattern of said tuner circuit substrate, said sheild case having a first hole for receiving a screw to fasten said shield case to the chassis, said jack attachment plate having an attaching surface flush with a side surface of said shield case, said attaching surface having a second hole for receiving a screw to fasten said jack attachment plate to the chassis.

* * * * *